United States Patent [19]

Sextro et al.

[11] 4,151,346

[45] Apr. 24, 1979

[54] PROCESS FOR PREPARING OXYMETHYLENE POLYMERS IN A GRANULAR FORM

[75] Inventors: Günter Sextro; Karlheinz Burg, both of Naurod Helmut Schlaf, Fischbach Hans J. Leugering, Frankfurt; Alwin Heller, Erzhausen, all of Fed. Rep. of Germany

[73] Assignee: Hoechst Aktiengesellschaft, Frankfurt am Main, Fed. Rep. of Germany

[21] Appl. No.: 872,441

[22] Filed: Jan. 26, 1978

Related U.S. Application Data

[63] Continuation of Ser. No. 661,755, Feb. 26, 1976, abandoned.

[30] Foreign Application Priority Data

Feb. 28, 1975 [DE] Fed. Rep. of Germany ....... 2508886

[51] Int. Cl.$^2$ ................... C08G 2/22; C08G 2/28; C08G 16/02

[52] U.S. Cl. .................. 528/230; 528/495; 528/499; 528/503

[58] Field of Search .......... 260/67 FD, 67 R; 528/230, 495, 499, 503

[56] References Cited

U.S. PATENT DOCUMENTS 3,371,066  2/1968  Grundmann et al. ............. 260/67

*Primary Examiner*—Lester L. Lee
*Attorney, Agent, or Firm*—Curtis, Morris & Safford

[57] ABSTRACT

Oxymethylene polymers are obtained in a granular form by cooling a solution or dispersion of an oxymethylene polymer, the temperature of which solution or dispersion is above the sintering temperature of the oxymethylene polymer, to a temperature just below the sintering temperature of the oxymethylene polymer. As dissolving or dispersing agent as well as precipitating and cooling agent there is used a mixture of methanol and water having a methanol content of at least 75% by weight. The oxymethylene polymer obtained is suitable as engineering plastic for preparing moulded articles.

6 Claims, No Drawings

PROCESS FOR PREPARING OXYMETHYLENE POLYMERS IN A GRANULAR FORM

This is a continuation of application Ser. No. 661,755 filed Feb. 26, 1976, now abandoned.

The preparation of oxymethylene polymers (POM) by copolymerization of formaldehyde or cyclic oligomers of formaldehyde, especially 1,3,5-trioxane, with suitable comonomers, especially cyclic ethers or cyclic acetals, is known (cf. U.S. Pat. Nos. 3,027,352 and 3,803,094). It is further known that granular oxymethylene polymers are obtained by introducing a solution of oxymethylene polymers into a precipitating agent having a temperature just below the sintering temperature of the oxymethylene polymer (cf. U.S. Pat. No. 3,371,066).

The present invention provides a process for preparing a granular oxymethylene polymer containing besides oxymethylene units from 0.1 to 20% by weight of oxyalkylene units having from 2 to 8 adjacent carbon atoms in the main chain, by introducing a solution or a fine dispersion of the oxymethylene polymer into a liquid cooling agent being kept in turbulent motion at a temperature of from 1° to 10° C. below the sintering temperature of the oxymethylene polymer, which comprises (a) precipitating the oxymethylene polymer by introducing a 3 to 35% by weight solution or dispersion of the oxymethylene polymer in a methanol/water mixture having a methanol content of at least 75% by weight, the temperature of which solution or dispersion being from 5° to 65° above the sintering temperature of the oxymethylene polymer, into a methanol/water mixture acting as a cooling agent and having a methanol content of at least 75% by weight, the quantity of the precipitated oxymethylene polymer in the suspension formed being at most 25% by weight, and (b) separating the granular oxymethylene polymer obtained and drying it. The invention also provides granular oxymethylene polymers prepared by the aforesaid process.

Under oxymethylene polymers according to the invention there are to be understood poly(oxymethylenes) containing in the main valence chain besides oxymethylene units from 0.1 to 20, preferably from 0.5 to 10% by weight of oxyalkylene units having from 2 to 8, preferably 2, 3 or 4 adjacent carbon atoms; oxymethylene polymers having a portion of from 1 to 5% by weight of oxyalkylene units are especially suitable. The terminal groups of the oxymethylene polymers are preferably primary alcohol groups.

The oxymethylene polymers are prepared in known manner by polymerization of the monomers in bulk, suspension or solution in the presence of cationicallly active catalysts, for example at a temperature of from 0° to 100° C., preferably of from 50° to 90° C. (cf. U.S. Pat. No. 3,027,352). The cationically active catalysts which can be used are:

(1) protonic acids, for example perchlorid acid, (2) esters of protonic acids, especially esters of perchloric acid with aliphatic alcohols of low molecular weight, for example perchloric acid tertiary butyl ester, (3) anhydrides of protonic acids, especially mixed anhydrides of perchloric acid and an aliphatic carboxylic acid of low molecular weight, for example acetyl perchlorate, (4) Lewis acids, especially halides of boron, tin, titanium, phosphorus, arsenic and antimony, for example boron trifluoride, tin tetrachloride, titanium tetrachloride, phosphorus pentachloride, phosphorus pentafluoride, arsenic pentafluoride and antimony pentafluoride, and (5) complex compounds or salt like compounds, preferably etherates or onium salts, of Lewis acids, for example boron trifluoride diethyletherate, boron trifluoride-di-n-butyletherate, triethyloxonium tetrafluoroborate, trimethyloxonium hexafluorophosphate, triphenylmethyl hexafluoroarsenate, acetyltetrafluoroborate, acetylhexafluorophosphate and acetylhexafluoroaresenate.

The quantity of the catalysts used in the copolymerization depends primarily on their efficiency and is generally from 0.1 to 2,000, preferably from 0.2 to 500 ppm, calculated on the total quantity of the compounds to be polymerized. Very efficient catalysts such as boron trifluoride are advantageously used in an amount of from 10 to 150, preferably of from 20 to 100 ppm, calculated on the total quantity of the compounds to be polymerized. The corresponding molar quantities should be used for complex compounds or salt-like compounds. Highly active catalysts such as perchloric acid are used in an amount of from 0.2 to 10, preferably of from 0.3 to 5 ppm.

It is generally advisable to use the catalysts in a diluted form. Gaseous catalysts are diluted with an inert gas, for example, nitrogen and noble gases such as argon, whereas liquid or solid catalysts are dissolved in an inert solvent. Suitable solvents are especially aliphatic or cycloaliphatic hydrocarbons as well as nitrated aliphatic or aromatic hydrocarbons, for example, cyclohexane, methylene chloride, ethylene chloride, nitromethane and nitrobenzene. The weight ratio of catalyst to diluent is usually from 1:5 to 1:10,000, preferably from 1:10 to 1:100. Very strongly acting catalysts are advantageously diluted in a proportion of from 1:5,000 to 1:20,000.

The polymerization is preferably effected in an inert gas atmosphere with the exclusion of moisture; suitable inert gases are preferably noble gases such as argon, and nitrogen.

Suitable compounds copolymerizable with trioxane especially include (a) cyclic ethers 3, 4 or 5 ring members, preferably epoxides, (b) cyclic acetals, preferably formals, having from 5 to 11, preferably 5, 6, 7 or 8 ring members, and (c) linear polyacetals, preferably polyformals.

Suitable comonomers for trioxane are especially compounds of the formula

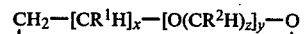

wherein (A) $R^1$ and $R^2$ are identical or different and represent each a hydrogen atom, an aliphatic alkyl radical having from 1 to 6, preferably 1, 2, 3 or 4 carbon atoms, or a phenyl radical, and (a) x is 1, 2 or 3 and y is zero, or (b) x is zero, y is 1, 2 or 3 and z is 2, or (c) x is zero, y is 1 and z is 3, 4, 5 or 6, or (B) $R^1$ is an alkoxymethyl radical having from 2 to 6, preferably 2, 3 or 4 carbon atoms, or a phenoxymethyl radical, x being 1 and y being zero and $R^1$ having the meaning given above.

Suitable cyclic ethers include, for example, ethylene oxide, propylene oxide, styrene oxide, cyclohexane oxide, oxacyclobutane and phenylglycidyl ether, and suitable cyclic formals are, for example 1,3-dioxolane, 1,3-dioxane, 1,3-dioxepane and 1,3,6-trioxocane as well as 4-methyl-1,3-dioxolane, 4-phenyl-1,3-dioxolane, 1,3-dioxonane and 1,3-dioxacycloheptene-(5). Suitable polyformals include especially poly(1,3-dioxolane) and poly(1,3-dioxepane).

For preparing oxymethylene polymers having a molecular weight in a specific range the polymerization is advantageously carried out in the presence of a regulator. For this purpose there may be used especially formaldehyde dialkylacetals having from 3 to 9, preferably 3, 4 or 5 carbon atoms, for example formaldehyde dimethylacetal, diethylacetal, dipropylacetal and dibutylacetal, as well as aliphatic alcohols of low molecular weight, preferably alkanols having from 1 to 4 carbon atoms, for example methanol, ethanol, propanol and butanol. The regulator is generally used in an amount of up to 0.5% by weight, preferably of from 0.005 to 0.1% by weight, calculated on the total quantity of the compounds to be polymerized.

In order to remove instable portions the oxymethylene polymers are subjected advantageously to a controlled thermal partial degradation yielding primary terminal alcohol groups (cf. U.S. Pat. Nos. 3,174,948, 3,219,623 and 3,666,714). The thermal treatment is performed at a temperature of from 130° to 200° C., preferably of from 140° to 190° C., especially under non-acid conditions in aqueous/methanolic solution, advantageously in the presence of a compound showing a basic reaction, for example a tertiary aliphatic amine of low molecular weight, such as triethyl amine or triethanol amine, or a secondary alkali metal phosphate such as disodium hydrogen phosphate. A temperature of from 150° to 180° C. is especially advantageous. The length of time of the thermal treatment depending on the temperature goes from 10 seconds to 2 hours, preferably from 1 minute to 60 minutes. The higher the temperature, the shorter the residence time. At a temperature of 180° C. about 1 to 2 minutes are sufficient, about 5 to 10 minutes at a temperature of 160° C., about 10 to 30 minutes at a temperature of 150° C. and about 20 to 60 minutes at a temperature of 140° C. The treatment is preferably carried out under substantial exclusion of oxygen.

As starting material for the process according to the invention there is used a solution or fine dispersion of an oxymethylene polymer containing from 3 to 35, preferably from 5 to 30% by weight of polymer. A polymer solution or dispersion containing from 10 to 25% by weight of oxymethylene polymer gives especially good results.

As solvent or dispersing agent there is used a methanol/water mixture having a methanol content of at least 75% by weight; a mixture consisting of from 99.9 to 80% by weight of methanol and of from 0.1 to 20% by weight of water is used preferably. A mixture consisting of from 99.5 to 85% by weight of methanol and of from 0.5 to 15% by weight of water is especially advantageous, and the best results are obtained when using a mixture consisting of from 99 to 90% by weight of methanol and of from 1 to 10% by weight of water.

The temperature of the solution or dispersion is 5 to 65, preferably 10° to 60° C. above the sintering temperature of the oxymethylene polymer, a temperature range of from 25° to 55° C. above the sintering temperature being especially advantageous.

As cooling agent and precipitating agent there is also used a mixture of methanol and water, the proportion of the components of which being in the same range as the aforesaid solvent or dispersing agent. The cooling agent has a temperature of from 1° to 10°, preferably of from 1° to 5°, especially of from 2° to 4° C. below the sintering temperature of the oxymethylene polymer. The quantity of the precipitated oxymethylene polymer in the suspension formed by introducing the polymer solution or dispersion is at most 25, preferably in the range of from 5 to 15% by weight.

The methanol used within the scope of the present invention may contain up to 30, preferably up to 10% by weight of organic impurities soluble in methanol, usually formed as byproducts in the synthesis of oxymethylene polymers, for example formaldehyde, cyclic oligomers of formaldehyde, methyllal, glycol formal, glycol monomethyl ether, glycol dimethyl ether as well as aliphatic alcohols of low molecular weight, aliphatic esters of low molecular weight and acetone.

The sintering temperature ($T_s$) is the temperature at which the solid polymer particles suspended in the methanol/water mixtures soften at the surface and stick together, without completely melting. It depends on the composition and the molecular weight of the polymer as well as on the nature of the solvent or dispersing agent. The sintering temperature of the oxymethylene polymers used according to the invention is in the range of from 100° to 140°, especially of from 125° to 135° C.

The process of the invention may be carried out, for example, in an autoclave provided with a stirrer. The cooling and precipitating agent are charged into this autoclave and the solution or dispersion of the oxymethylene polymer is introduced advantageously through a heated immersion pipe or a nozzle into the precipitating agent, the latter being kept in turbulent motion by stirring. The process may be carried out discontinuously or continuously; in the continuous method the polymer suspension obtained is withdrawn at the bottom of the autoclave at the same rate at which the solution or dispersion as well as an optical additional precipitating agent are added. The average residence time of the oxymethylene polymer in the precipitation vessel is in the range of from 1 minute to 12 hours, preferably of from 2 to 120 minutes. The pressure is in the range of from 5 to 40, preferably of from 8 to 30 bars depending on the temperature used in each case.

The separating of the granular oxymethylene polymers obtained by precipitation or agglomeration is performed by the usual methods, for example by filtration, decantation or centrifugation. The separated oxymethylene polymer finally is dried at a temperature of from 20° to 135° C., preferably of from 50° to 120° C. Drying under an inert gas atmosphere, for example, under a noble gas or nitrogen atmosphere is advisable.

The oxymethylene polymers obtained according to the invention are macromolecular: their reduced specific viscosity (RSV) is in the range of from 0.3 to 2.0, preferably of from 0.5 to 1.5 dl/g (measured with a 0.5% by weight solution of the polymer in γ-butyrolactone, containing 2% by weight of diphenylamine as stabilizer, at a temperature of 140° C.). The crystallite melting points of the oxymethylene polymers are in the range of from 140° to 180° C., their melt indices MFI 190/2 are in the range of from 0.1 to 50, preferably of from 1 to 30 g/10 minutes (measured according to DIN=German Industrial Standard No. 53,735 at a temperature of 190° C. under a load of 2.16 kg).

The process according to the invention enables preparing granular oxymethylene polymers having an increased content of dry matter (after precipitation) and an increased apparent density (after drying). The apparent density of the granular product is generally at least 300 g/l, preferably of from 350 to 550 g/l (measured with the polymer dried at a temperature of 70° C. under nitrogen after having been mixed homogeneously for 2 minutes in a laboratory fluid mixer at a speed of 3,000 revolutions per minute).

The oxymethylene polymers obtained according to the invention may be stabilized additionally against the action of heat, oxygen and/or light by mixing them homogeneously with stabilizers. Homogenization is usually carried out in a commercial mixing device, for example, an extruder, at a temperature above the melting point of the polymer up to 250° C., preferably of from 180° to 210° C. The total amount of the added stabilizers is in the range of from 0.1 to 10, preferably of from 0.5 to 5% by weight, calculated on the total mixture.

As stabilizers there are especially useful bisphenol compounds, alkaline earth metal salts or carboxylic acids as well as guanidine compounds. The bisphenol compounds used are preferably esters of monobasic 4-hydroxyphenylalkanoic acids which are substituted in the nucleus once or twice by an alkyl radical having from 1 to 4 carbon atoms and which have from 7 to 13, preferably 7, 8 or 9 carbon atoms, with aliphatic di-, tri- or tetrahydric alcohols having from 2 to 6, preferably 2, 3 or 4 carbon atoms. Examples are esters of ω-(3-tertiary butyl-4-hydroxyphenyl)-pentanoic acid, β-(3-methyl-5-tertiary butyl-4-hydroxyphenyl)-propionic acid, (3,5-di-tertiary butyl-4-hydrophenyl) acetic acid, β-(3,5-di-tertiary butyl-4-hydroxyphenyl)-propionic acid or (3,5-di-isopropyl-4-hydroxyphenyl)-acetic acid with ethylene glycol, propane diol-(1,2), propane diol-(1,3), butane diol-(1,4), hexane diol-(1,6), 1,1,1-trimethylol ethane or pentaerythritol.

Suitable alkaline earth metal salts of carboxylic acids are especially alkaline earth metal salts of aliphatic, preferably hydroxyl groups containing mono-, bi- or tribasic carboxylic acids having from 2 to 20, preferably from 3 to 9 carbon atoms, for example the calcium or magnesium salts or stearic acid, ricinoleic acid, lactic acid, mandelic acid, malic acid or citric acid.

Suitable guanidine compounds are compounds of the formula

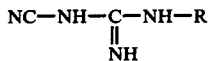

wherein R is a hydrogen atom, a cyano group or an alkyl radical having from 1 to 6 carbon atoms, for example cyanoguanidine, N-cyano-N'-methyl-guanidine, N-cyano-N'-ethyl-guanidine, N-cyano-N'-isopropyl-guanidine, N-cyano-N'-tertiary butylguanidine or N,N'-dicyanoguanidine. The guanidine compound is used optionally in an amount of from 0.01 to 1, preferably of from 0.1 to 0.5% by weight, calculated on the total mixture.

In addition there may be added to the oxymethylene polymer prepared according to the invention known light stabilizers, for example derivatives of benzophenone, acetophenone or triazine. Further usual additives, for example dyestuffs, pigments, reinforcing materials and fillers may also be used.

The oxymethylene polymers may be processed by all methods usually employed for thermoplastics, for example by injection moulding, extrusion, blowing of extruded material, melt spinning and deep drawing. They are suitable for preparing semi-finished products and finished products such as shaped articles, for example bars, rods, plates, ribbons, bristles, threads, fibers, films, sheets, tubes and flexible tubes, as well as household articles, for example dishes and cups, and machine elements such as casings and gear wheels. They are especially suitable as engineering plastic for preparing dimensionally stable and true to shape articles.

The following examples illustrate the invention:

EXAMPLE 1

3 kg of a copolymer of 98% by weight of trioxane and 2% by weight of ethylene oxide having a RSV value of 0.65 dl/g, a crystallite melting point of 165° C. and a MFI value of 25 g/10 minutes were mixed in an autoclave with 30 kg of a mixture of 85% by weight of methanol, 14.9% by weight of water and 0.1% by weight of triethylamine. The suspension formed was heated under nitrogen for 5 minutes to 160° C., whereby the polymer dissolved. 2 kg per minute of the solution obtained were passed continuously through an immersion pipe into 10 kg of a mixture of 85% by weight of methanol and 15% by weight of water contained in a further autoclave and being kept at a temperature of 125° C. in turbulent motion under nitrogen. (At a sintering temperature of the polymer of 127° C. the temperature of the precipitating agent consequently was 2° C. below the said temperature). During the solution and precipitation process the pressure in the autoclave was 17 and 9 bars respectively. The precipitated granular polymer was withdrawn at the bottom of the autoclave 7 minutes after having terminated the introduction and separated by suction from the solvent and precipitating agent; the solid product had a content of dry matter of about 40%. After drying and homogeneous mixing the polymer had an apparent density of 350 g/l.

EXAMPLE 2

Example 1 was repeated, but by using as solvent and as precipitating agent each time a mixture of 90% by weight of methanol, 9.9% by weight of water and 0.1% by weight of triethylamine. The temperature during the solution process was 170° C. The granular polymer had a content of dry matter of about 38% after suction of the solvent and precipitating agent and an apparent density of 380 g/l after drying and homogeneously mixing.

EXAMPLE 3

7.5 kg of a copolymer of 98% by weight of trioxane and 2% by weight of ethylene oxide having a RSV value of 0.65 dl/g, a crystallite melting point of 165° C. and a MFI value of 25 g/10 minutes were mixed in an autoclave with 22.5 kg of a mixture of 96.5% by weight of methanol, 3.4% by weight of water and 0.1% by weight triethylene. The suspension formed was heated under nitrogen for 5 minutes to 180° C., whereby the polymer dissolved. The solution obtained was introduced continuously over a period of 30 minutes, through an immersion pipe, into a mixture of 96.5% by weight of methanol and 3.5% by weight of water contained in a further autoclave and being kept at a temperature of 131° C. in turbulent motion under nitrogen. (At a sintering temperature of the polymer of 133° C. the temperature of the precipitating agent was consequently 2° C. below the said temperature). The pressure in the autoclave during the solution and precipitation process was 30 and 10 bars respectively. 15 minutes after having terminated the introduction the precipitated granular polymer was withdrawn at the bottom of the autoclave and separated by suction from the solvent and precipitating agent; the dry matter content of the solid product was about 45%. After drying and homogeneously mixing the dry polymer had an apparent density of 450 g/l.

COMPARATIVE EXAMPLE 3 kg of a copolymer of 98% by weight of trioxane and 2% by weight of ethylene oxide having a RSV value of 0.65 dl/g, a crystallite melting point of 165° C. and a MFI value of 25 g/10 minutes were mixed with 30 kg of a mixture of 60% by weight of methanol, 39.9% by weight of water and 0.1% by weight of triethylamine. The suspension obtained was heated for 5 minutes to 160° C., whereby the polymer dissolved. The solution formed thereby was cooled to a temperature of 135° C. 2 kg per minute of the solution were introduced continuously through an immersion pipe into 10 kg of a mixture of 60% by weight of methanol and 40% by weight of water contained in a further autoclave and being kept at a temperature of 125° C. in turbulent motion under nitrogen.

(At a sintering temperature of the polymer of 127° C. the temperature of the precipitating agent was consequently 2° C. below the said temperature.) 7 minutes after having terminated the introduction the precipitated granular polymer was withdrawn at the bottom of the autoclave and separated by suction from the solvent and precipitating agent. The content of dry matter of the solid product was about 33%. After drying and homogeneous mixing the apparent density of the dry product was 270 g/l.

What is claimed is:

1. A process for preparing a granular oxymethylene polymer of high bulk weight containing in addition to oxymethylene units from 0.1 to 20% by weight of oxyalkylene units having from 2 to 8 adjacent carbon atoms in the main chain which comprises preparing a solution or fine dispersion of the oxymethylene polymer in a methanol/water mixture having a methanol content of at least 75% by weight and a temperature of 5° to 65° C. above the sintering temperature of the oxymethylene polymer, introducing the solution or dispersion of the oxymethylene polymer into a turbulent liquid cooling agent which is a methanol/water mixture having a methanol content of at least 75% by weight at a temperature of 1° to 10° C. below the sintering temperature of the oxymethylene polymer to form granules of said polymer, separating the thus formed granular oxymethylene polymer and drying it to produce said high bulk weight granular polymer.

2. Process as claimed in claim 1, which comprises using as solvent or dispersing agent and as cooling agent a mixture of from 99.9 to 80% by weight of methanol and of from 0.1 to 20% by weight of water.

3. Process as claimed in claim 1, wherein the solvent or dispersing agent contains a basic compound.

4. Process as claimed in claim 1, wherein the cooling agent has a temperature of from 1° to 10° C. below the sintering temperature of the oxymethylene polymer.

5. A method according to claim 1 wherein the methanol concentration in the methanol/water mixture used to dissolve the oxymethylene polymer has substantially the same methanol concentration as that of the methanol/water mixture used as a cooling agent.

6. A process for preparing a granular oxymethylene polymer of high bulk weight containing in addition to oxymethylene units from 0.1 to 20% by weight of oxyalkylene units having from 2 to 8 adjacent carbon atoms in the main chain which comprises preparing a solution or fine dispersion of 3% to 35% by weight of the oxymethylene polymer in a methanol/water mixture having a methanol content of at least 75% by weight and a temperature of 5° to 65° C. above the sintering temperature of the oxymethylene polymer, introducing the solution or dispersion of the oxymethylene polymer into a turbulent liquid cooling agent which is a methanol/water mixture having a methanol content of at least 75% by weight at a temperature of 1° to 10° C. below the sintering temperature of the oxymethylene polymer to form granules of said polymer, the relative amounts of solution or dispersion and of cooling agent used being such that the proportion of polymer granules formed is no more than 25% by weight, separating the thus formed granular oxymethylene polymer and drying it to produce said high bulk weight granular polymer.

* * * * *